US008102993B2

United States Patent
Wang et al.

(10) Patent No.: US 8,102,993 B2
(45) Date of Patent: Jan. 24, 2012

(54) METHOD FOR ROUTING NETWORK CALL AND NETWORK CALL CENTER

(75) Inventors: Jianfeng Wang, Guangdong (CN); Yinghao Wu, Guangdong (CN); Xiangyu Zhong, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1094 days.

(21) Appl. No.: 11/913,562

(22) PCT Filed: Mar. 29, 2007

(86) PCT No.: PCT/CN2007/001022
§ 371 (c)(1),
(2), (4) Date: Nov. 5, 2007

(87) PCT Pub. No.: WO2007/118406
PCT Pub. Date: Oct. 25, 2007

(65) Prior Publication Data
US 2008/0192915 A1     Aug. 14, 2008

(30) Foreign Application Priority Data

Apr. 13, 2006  (CN) .......................... 2006 1 0066791
Apr. 13, 2006  (CN) .......................... 2006 1 0066795

(51) Int. Cl.
  *H04M 3/00*   (2006.01)
  *H04M 5/00*   (2006.01)
(52) U.S. Cl. ......... 379/265.02; 379/265.09; 379/265.11; 379/265.12
(58) Field of Classification Search ............. 379/265.02, 379/265.09, 265.11, 265.12
See application file for complete search history.

(56) References Cited

U.S. PATENT DOCUMENTS

| 5,450,482 A * | 9/1995 | Chen et al. .................... 379/230 |
| 5,513,255 A * | 4/1996 | Yoo et al. ...................... 379/133 |
| 6,611,590 B1 * | 8/2003 | Lu et al. .................... 379/265.09 |
| 2006/0140198 A1 | 6/2006 | Majeed et al. |

FOREIGN PATENT DOCUMENTS

| CN | 1452375 A | 10/2003 |
| CN | 1499847 A | 5/2004 |
| CN | 1585399 A | 2/2005 |
| EP | 1 122 937 A2 | 8/2001 |
| WO | WO 2005/002189 A1 | 1/2005 |

OTHER PUBLICATIONS

Partial Translation of Office Action dated Sep. 2, 2010 in connection with Chinese Patent Application No. 20078000340.2.
Written Opinion of the International Searching Authority dated Jul. 12, 2007 in connection with International Patent Application No. PCT/CN2007/001022.

* cited by examiner

*Primary Examiner* — Quynh Nguyen

(57) ABSTRACT

A method for routing a network call includes receiving a network call routing request from a requesting sub call center; determining a destination sub call center based on traffic distribution proportions for a network call service, in which the network call service corresponds to the received network call routing request, or determining a destination sub call center based on service capacity parameters of multiple sub call centers corresponding to the network call service, and forwarding the network call routing request to the determined destination sub call center for a call process. A network call center is also disclosed that includes multiple sub call centers and a Network Intelligent Routing Center (NIRC), in which the NIRC is used for receiving a network call routing request, determining the destination sub call and forwarding the received network call routing request to the determined destination sub call center.

5 Claims, 5 Drawing Sheets

Shared equipment

| | | | |
|---|---|---|---|
| Equipment ID | 1 | Equipment Type | Agent Group |
| Equipment Name | Zhejiang Network 1860 | Media Type | 1 VOICE |
| | | Home VDN | 1 vdnl |
| Routing Policy | Traffic Distribution Proportion Based Routing | | |
| Standard Time | 2006-2-18  13:32 | | |
| Interval (hour) | 1 | | |

Traffic Distribution Proportions of Equipments

| No | Call Center | Proportion |
|---|---|---|
| 1 | 1 Hangzhou Mobile | 6 |
| 2 | 2 Ningbo Mobile | 3 |
| 3 | 3 Wenzhou Mobile | 1 |

Add    Delete    Edit

OK    Cancel

Fig. 3

| Shared equipment | | | |
|---|---|---|---|
| Equipment ID | 2 | Equipment Type | Agent Group |
| Equipment Name | Zhejiang Network 1861 | Media Type | 1 VOICE |
| | | Home VDN | 1 vdn1 |

Routing Policy: Routing Expression Configuration

Call Distribution Policy: Distribution based on Call Loss Rate

Routing Expression: G/(G+F)

A  Present routing number of the line
B  Present taken seats in the call queue
C  Present idle seats in the call queue
D  Maximum queuing number set for the call queue
E  Present queuing number in the call queue
F  Put-through call number
G  Call loss
H  Average waiting time before putting through

[ OK ]  [ Cancel ]

Fig. 5

METHOD FOR ROUTING NETWORK CALL AND NETWORK CALL CENTER

FIELD OF THE TECHNOLOGY

The present invention relates to network routing technologies, and more particularly, but not exclusively, to a method for routing a network call and a network call center.

BACKGROUND OF THE INVENTION

A network call center usually includes a Network Intelligent Routing Center (NIRC) and multiple sub call centers. As shown in FIG. 1, there are Sub Call Center A, B and C. In the network call center, the NIRC, upon the receipt of a routing request from a requesting sub call center, acquires a destination sub call center based on equipment occupation rates of all the sub call centers, or acquires a predetermined sub call center as the destination sub call center. Then the destination sub call center interacts with the NIRC and the requesting sub call center to handle a service. The equipment occupation rate indicates the ratio of the traffic handled by equipment to the traffic handling capacity of the equipment.

In the working mode of taking a predetermined sub call center as the destination sub call center, since network calls cannot be routed flexibly based on the equipment occupation rates of the sub call centers, the routes are not properly distributed.

In the working mode of acquiring a destination sub call center based on the equipment occupation rates of the sub call centers, though the distribution of the destination sub call center is determined based on capacities of the equipment, different services may raise different demands for call centers, e.g., some services may demand be guaranteed with put-through rate, other services may demand be distributed among sub call centers in proportion. Network calls cannot be routed based on different demands of network call services in the prior art, which results in failure to provide flexible network call routing and decreases the quality of network call service.

SUMMARY OF THE INVENTION

Embodiments of the present invention provide a method for routing a network call and a network call center.

According to an embodiment of the invention, a method for routing a network call in a network call center is provided, the network call center includes multiple sub call centers, including:

a network call routing request is received from a requesting sub call center;

a destination sub call center is determined based on traffic distribution proportions for a network call service, in which the network call service corresponds to the received network call routing request, or a destination sub call center is determined based on service capacity parameters of the multiple sub call centers corresponding to the network call service, and the network call routing request is forwarded to the determined destination sub call center for a call process.

A network call center, including multiple sub call centers and a Network Intelligent Routing Center (NIRC), in which:

a sub call center is used for sending a network call routing request to the NIRC as a requesting sub call center, or, receiving a network call routing request to perform a call process as a destination sub call center; and the NIRC is used for receiving a network call routing request from the requesting sub call center, determining the destination sub call center based on traffic distribution proportions for a network call service, wherein the network call service corresponds to the received network call routing request, or determining the destination sub call center based on service capacity parameters of the multiple sub call centers corresponding to the network call service, and forwarding the received network call routing request to the determined destination sub call center.

It can be seen that the fore-going technical scheme may be achieved through the following blocks, receiving a network call routing request from a requesting sub call center, determining a destination sub call center based on traffic distribution proportions for a network call service, in which the network call service corresponds to received network call routing request, or determining a destination sub call center based on service capacity parameters of the sub call centers corresponding to the network call service, and forwarding the network call routing request to the determined destination sub call center for further call processes. Embodiments of the present invention achieve the requirements of proportion distribution based on the actual traffic volume of the network call service, or based on the service capacities of the sub call centers for network call service, in the network call routing process, which significantly improves the flexibility of the network call routing process.

BRIEF DESCRIPTION OF THE DRAWINGS

FIG. 3 is a schematic diagram illustrating a configuration interface in accordance with an embodiment of the present invention.

FIG. 5 is a schematic illustrating a configuration interface in accordance with an embodiment of the present invention.

DETAILED DESCRIPTION

Figure 1:
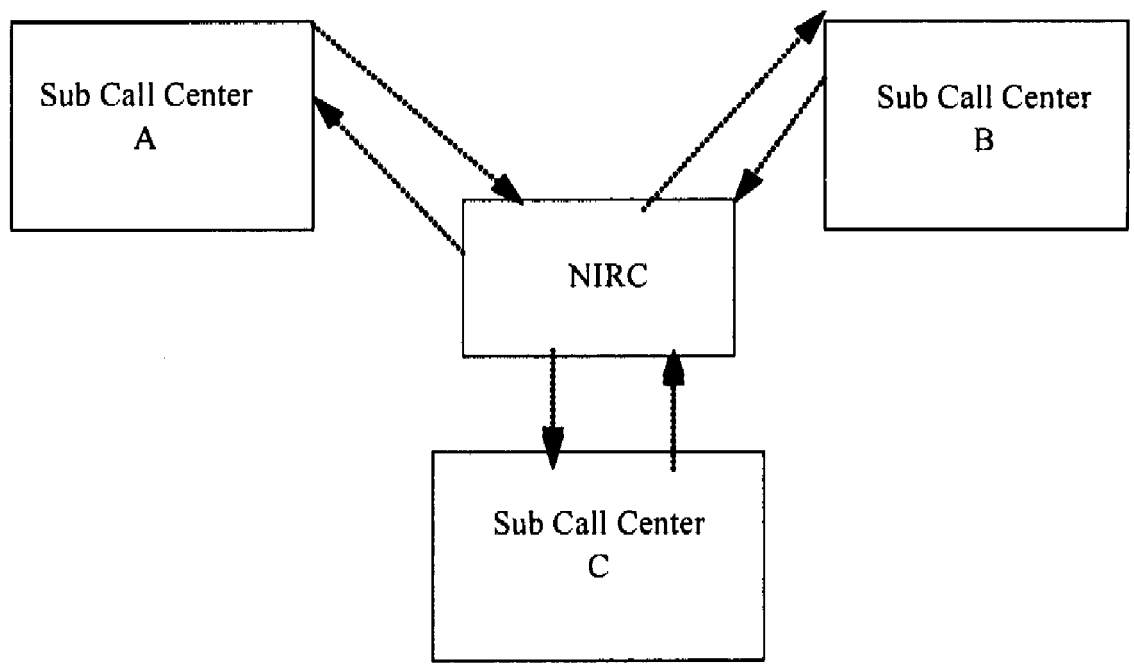
FIG. 1 is a schematic diagram illustrating an architecture of a network call center.

Embodiments are hereinafter described more fully, with reference to accompanying drawings.

The technical scheme in accordance with embodiments in the present invention includes: determining a destination sub call center based on traffic distribution proportions for a network call service, in which the network call service corresponds to a network call routing request, or determining a destination sub call center based on service capacity parameters of sub call centers corresponding to the network call service, and forwarding the network call routing request to the determined destination sub call center for further call process. Thus embodiments of the present invention significantly improve the flexibility of the network call routing process.

The sub call centers may register in advance in a shared equipment group, which corresponds to various network call services and in the shared equipment group each of the shared equipment corresponds to a sub call center.

Before the process of determining a destination sub call center based on the demand of the network call service, the method may further include a process of: verifying whether the shared equipment group includes shared equipment that corresponds to the requesting sub call center.

Access rights of the sub call centers to the shared equipment group may be configured.

Before the process of determining a destination sub call center based on the demand of the network call service, the method may further include a process of: verifying whether the requesting sub call center has the right to access the shared equipment group.

When the destination sub call center is determined based on the traffic distribution proportions for the network call service, the method may further include the processes of: setting the traffic distribution proportions of the sub call center for the network call service in advance, determining, based on the traffic distribution proportion of a sub call center, a distribution weight which may be added to the sub call center every time when the sub call center is taken as the destination sub call center, and setting the accumulative total call numbers for each sub call center. The method of determining a destination sub call center based on the traffic distribution proportions for the network call service may include the processes of: taking, according to the accumulative total call numbers of the sub call centers respectively, the sub call center with the smallest accumulative total call number as the destination sub call center, and adding the distribution weight to the accumulative total call number of the destination sub call center. The initial value of the accumulative total call number may be set as 0.

The setting of the distribution weight, which is added to the accumulative total call number of a sub call center every time when the sub call center is taken as the destination sub call center, includes the processes of:

calculating the Lease Common Multiple (LCM) of the traffic distribution proportion of each sub call center, dividing the LCM by the traffic distribution proportion of the sub call center, and taking the result as the distribution weight of the sub call center.

The destination sub call center is determined for the network call routing request from the requesting sub call center based on the traffic distribution proportions of the sub call centers for the network call, and the destination sub call center will handle the network call in the follow-up process, thus the network call is routed based on the traffic distribution proportions.

Furthermore, by setting the traffic distribution proportions and the distribution weights based on the LCM of the traffic distribution proportions of sub call centers, the routing process based on the traffic distribution proportions is easy to be applied and includes little calculation, which in turn reduces system workload.

When the destination sub call center is determined based on the service capacity parameters of the sub call centers for the network call service, the service capacity parameters include a put-through rate or a call loss rate. The method further includes the processes of: reporting the put-through call numbers or call losses thereof by the sub call centers periodically; and the process of determining the destination sub call center based on the service capacity parameters of the sub call centers for the network call service includes the processes of: calculating the put-through rates or the call loss rates of the sub call centers based on the put-through call numbers or call losses reported by the sub call centers, and taking the sub call center with the highest put-through rate or lowest call loss rate as the destination sub call center.

A cyclic moving window algorithm may be used for calculating the put-through rates or the call loss rates of the sub call centers.

For the network call routing request from the requesting sub call center, the destination sub call center is determined based on the service capacity parameters of the sub call centers for the network call, and the destination sub call center will handle the network call in the follow-up process, thus the network call is routed based on the actual service capacities of the sub call centers.

Furthermore, the cyclic moving window algorithm is used for calculating the put-through rates or the call loss rates, which improves the accuracy in the calculation of the service capacity parameters of the sub call centers, and further improves the quality of the network call service.

The processes of determining the destination sub call center and forwarding the network call routing request may be performed by the NIRC in the network call center. According to an embodiment of the present invention, a sub call center in the network call center is used as the requesting sub call center for sending a network call routing request to the NIRC, and/or, as the destination sub call center for receiving a network call routing request for further call process; the NIRC is used for receiving the network call routing request from the requesting sub call center, determining the destination sub call center based on the demands of the service corresponding to the network call request, and forwarding the received network call routing request to the destination sub call center determined.

A detailed description of the present invention is provided hereinafter with reference to the embodiments of the present invention.

In one embodiment, the destination sub call center is determined based on the traffic distribution proportions for the network call service. In this embodiment, the sub call center may send requests to the NIRC in advance to register in the shared equipment group in which the network call is routed based on traffic distribution proportions. The sub call center map the equipment corresponding to specific services that may be routed in the network as shared network equipment, thus the sub call center may also be the network sub call center. For services that will be routed in the network based on the traffic distribution proportions, the sub call center that may route traffics to each other register corresponding shared network equipment in the NIRC and thus a shared equipment group in which services will be routed in the network based on the traffic distribution proportions for the services is formed. The NIRC may configure the shared equipment group as a group in proportion based routing mode, and further configure the access rights of the sub call center.

The NIRC keeps a record of the shared equipment with multiple sub call centers that routes network calls based on traffic distribution proportions, and further configures the traffic distribution proportion of each sub call center in a group of shared equipment, calculates the LCM of all traffic distribution proportions of the sub call centers in the group of shared equipment, and obtains the distribution weights of the sub call centers through dividing the LCM by the traffic distribution proportions of the sub call centers respectively. In addition, in every group of shared equipment managed by the NIRC, the sub call centers are ranked according to the accumulative total call numbers thereof, and when the sub call centers are ranked in an ascending order, the initial values of accumulative total call numbers of all the sub call centers may be set as 0.

Figure 2:
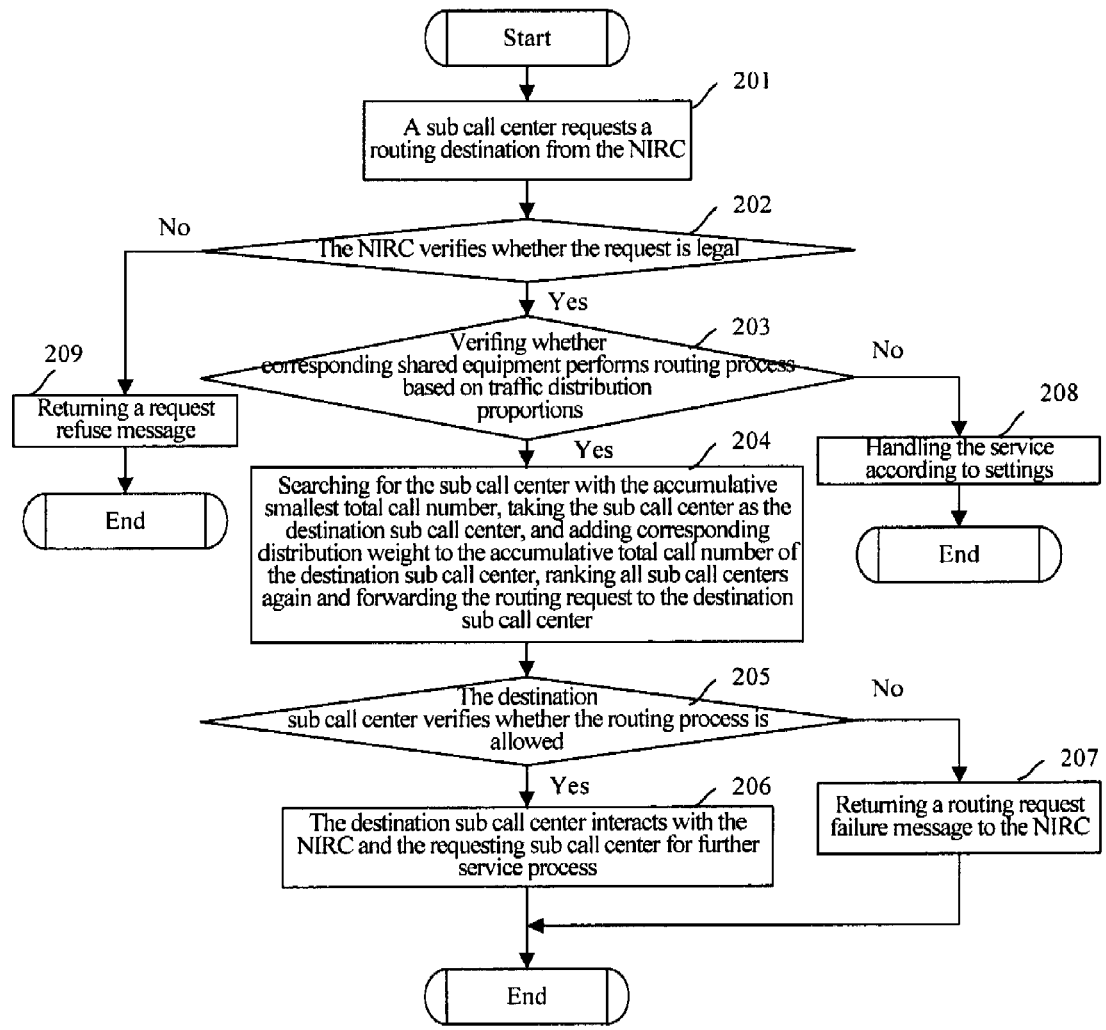
FIG. 2 is a flow chart illustrating an embodiment of the present invention.

After performing the configuration mentioned above, the network call routing in a network call process, as shown in FIG. 2, includes:

Block 201: Receiving a call request by a sub call center and sending a routing request, i.e., a request for acquiring information of a destination sub call center, to the NIRC by the sub call center as the requesting sub call center.

The sub call center in this embodiment will request a routing destination from the NIRC for any received call service that has registered to be routed in the network based on traffic distribution proportions.

Block 202: Verifying, by the NIRC according to the received network call routing request, the configurations of the requesting sub call center and shared equipment, whether the requesting sub call center is legal, i.e., whether the requesting sub call center is a network sub call center and has the right to access corresponding shared equipment group, performing Block 203 if the sub call center is legal; otherwise performing Block 209.

Block 203: Verifying whether the shared equipment group to which the requesting sub call center belongs is configured to adopt traffic distribution proportion based routing, performing Block 204 if the shared equipment group is configured to adopt traffic distribution proportion based routing; otherwise performing Block 208.

Block 204: Searching by the NIRC for the sub call center with the smallest accumulative total call number in the shared equipment group and taking the sub call center as the destination sub call center, adding the distribution weight to the accumulative total call number of the destination sub call center, ranking all the sub call centers again, and forwarding the network call routing request to the destination sub call center.

Block 205: Verifying by the destination sub call center upon the receiving the network call routing request, whether the routing is allowed according to the equipment status and routing conditions, and performing Block 206 if the routing is allowed; otherwise performing Block 207.

Block 206: Connecting the NIRC and the requesting sub call center by the destination sub call center for further service processes, and then terminating the process. Besides, when the determined destination sub call center is the requesting sub call center, the NIRC will return the call directly to the requesting sub call center for further process.

Block 207: Returning a routing request failure message by the destination sub call center to the NIRC and terminating the process.

Block 208: Handling the process based on another routing policy configured for the group of shared equipment and then terminating the process.

Block 209: Returning a refusing message to the requesting sub call center and terminating the process.

The details of Blocks 205 to 209 were disclosed in the invention application No. CN02108985.X, titled "Network Call Center System and Method for Handling Network Calls", filed on Apr. 18, 2002, and thus will not be explained herein.

An example is provided hereinafter to further explain embodiments of the present invention.

FIG. 3 is a schematic diagram illustrating a configuration interface for a group of shared equipment which adopts traffic distribution proportion based routing mode. In FIG. 3, the sub call centers Hangzhou Mobile, Ningbo Mobile and Wenzhou Mobile have registered in the NIRC as shared equipment adopting call traffic proportion based routing mode for 1860 service. The shared equipment group is named Zhejiang Network 1860 and the call distribution proportion among the three sub call centers is set to 6:3:1. Accordingly the distribution weights of the three sub call centers are 3, 6 and 18 respectively. In call process, every time a sub call center is taken as the destination sub call center, the corresponding distribution weight will be added into the accumulative total call number of the sub call center.

After performing the configuration, when one of the three sub call centers receives a call request for 1860 service, the sub call center will send a routing request to the NIRC, which takes the sub call center with the smallest accumulative total call number among the three sub call centers as the destination sub call center and adds corresponding distribution weight into the accumulative total call number of the chosen sub call center. When the destination sub call center is the requesting sub call center, the call request will be returned to the requesting sub call center directly for further process. Otherwise, i.e., when the destination sub call center is different from the requesting sub call center, a connection is established between the destination and the requesting sub call centers to forward the network call, i.e., perform Block 206.

In another embodiment, the destination sub call center is determined based on the service capacity parameters of the sub call centers for the network call service. This embodiment, in which the service capacity parameters include put-through rate, is described hereinafter to further explain the present invention.

In this embodiment, the sub call centers may send requests to the NIRC in advance to register in the shared equipment group in which the network call routing is determined based on put-through rates of the sub call centers. The sub call centers map the equipment corresponding to specific service that may be routed in the network as shared network equipment, thus the sub call centers may also be the network sub call centers. For a service that will be routed in the network based on the put-through rates, the sub call centers that may route traffics to each other register corresponding shared network equipment in the NIRC and thus a shared equipment group in which service will be routed in the network based on the put-through rates for the service is formed, and the NIRC will configure the shared equipment group as a group in put-through rate based routing mode, and further configure the access rights of the sub call centers.

The sub call centers that have registered in shared equipment in put-through rate based routing mode will report the equipment statuses, e.g., the put-through call numbers and call losses, of the sub call centers periodically to the NIRC. The NIRC keeps a record of the equipment statuses reported by the sub call centers, calculates the put-through rates and call losses of the sub call centers respectively, and saves the calculated put-through rates and call losses as sample data into a reported status information list of the shared equipment corresponding to the sub call centers.

The put-through rate may be calculated with a cyclic moving window algorithm, including the process of: taking the interval at which the sub call centers report to the NIRC the put-through call numbers and call losses corresponding to the shared equipment as a sample interval, the minimum value of which is 1 second, and setting a statistical duration, e.g., 1 minute, which includes 61 sample points at most with sample point numbers from 0 to 60 in a cyclic order. According to the cyclic moving window algorithm, the put-through rate is calculated by subtracting the data at the sample point just before the statistical duration from the data of the present sample point. If AC indicates a put-through call number index, DC indicates a call loss index, m indicates the sample interval, n indicates the present sample point, T indicates the statistical duration, since put-through rate=put-through call number/(put-through call number+call losses), the expression used for calculating the put-through rate in this embodiment is as follows:

$$(AC_n - AC_{n-T/m})/((DC_n - DC_{n-T/m}) + (AC_n - AC_{n-T/m})).$$

If report interval of the shared equipment corresponding to the routing request of the requesting sub call center is 2 seconds, the statistical duration T is 1 minute and the sample points are numbered from 0 to 60 in a cyclic order, as the cyclic moving window algorithm is adopted, when the present sample point number is 30, the put-through rate may be calculated with the following expression:

$$(AC[30]-AC[0])/((DC[30]-DC[0])+(AC[30]-AC[0]));$$

and when the present sample point number is 29, the put-through rate may be calculated with the following expression:

$$(AC[29]-AC[59])/((DC[29]-DC[59])+(AC[29]-AC[59])).$$

In the fore-going descriptions, the put-through rate is taken as the service capacity parameter. When the call loss rate is taken as the service capacity parameter, the call loss rate may be calculated with the following expression: call loss rate=call losses/(put-through call number+call losses), or with the cyclic moving window algorithm as described above, i.e., call loss rate=$(DC_n-DC_{n-T/m})/((DC_n-DC_{n-T/m})+(AC_n-AC_{n-T/m}))$. When the call loss rate is taken as the service capacity parameter, the sub call center with the lowest call loss rate will be the destination sub call center.

Figure 4:
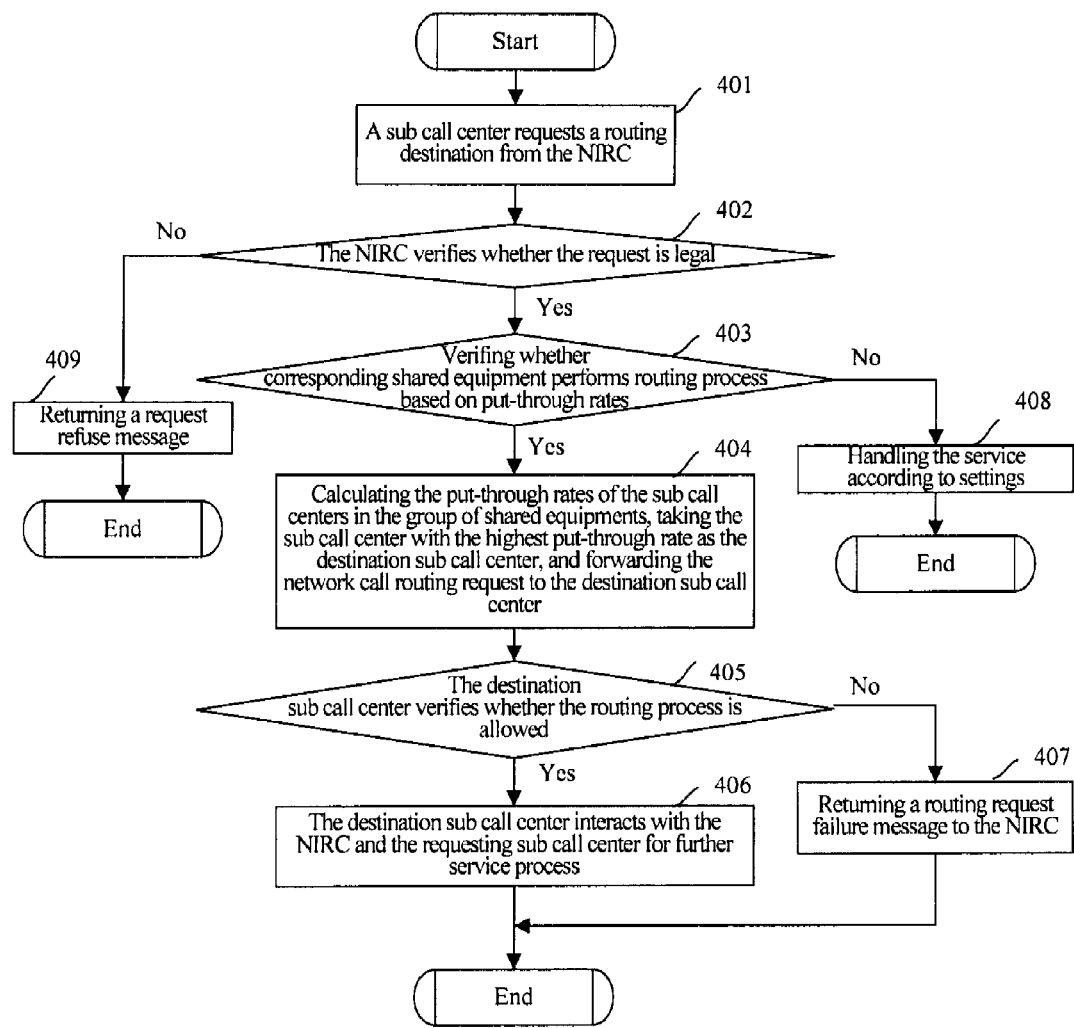
FIG. 4 is a flow chart illustrating another embodiment of the present invention.

After the above configuration, the network call routing in a network call process, as shown in FIG. 4, includes:

Block 401: Receiving a call request by a sub call center and sending a routing request, i.e., a request for acquiring information of a destination sub call center, to the NIRC by the sub call center as the requesting sub call center.

The sub call center in this embodiment will request a routing destination from the NIRC for any received call service that has registered to be routed in the network based on the put-through rates.

Block 402: Verifying, by the NIRC according to the received network call routing request, the configurations of the requesting sub call center and the shared equipment thereof, whether the requesting sub call center is legal, i.e., whether the requesting sub call center is a network sub call center and has the right to access corresponding shared equipment group, performing Block 403 if the sub call center is legal; otherwise performing Block 409.

Block 403: Verifying whether the shared equipment group to which the requesting sub call center belongs is configured to adopt put-through rate based routing, performing Block 404 if the shared equipment group above is configured to adopt put-through rate based routing; otherwise performing Block 408.

Block 404: Calculating, by the NIRC, the put-through rates of the sub call centers in the shared equipment group, taking the sub call center with the highest put-through rate as the destination sub call center, and forwarding the network call routing request to the destination sub call center.

Block 405: Verifying, by the destination sub call center upon receiving the network call routing request, whether the routing is allowed according to its equipment status and routing conditions, and performing Block 406 if the routing is allowed; otherwise performing Block 407.

Block 406: Connecting the NIRC and the requesting sub call center with the destination sub call center for further service process, and then terminating the process. If the determined destination sub call center is the requesting sub call center, the NIRC will return the call directly to the requesting sub call center for further process.

Block 407: Returning a routing request failure message by the destination sub call center to the NIRC and terminating the process.

Block 408: Handling the process based on another routing policy configured for the shared equipment group and terminating the process.

Block 409: Returning a refusing message to the requesting sub call center and terminating the process.

Likewise, the details of Blocks 405 to 409 were disclosed in the invention application No. CN02108985.X, titled Network Call Center System and Method for Handling Network Calls, filed on Apr. 18, 2002, and thus will not be explained herein.

An example is provided hereinafter to further explain embodiments of the present invention.

FIG. 5 is a schematic illustrating a configuration interface for shared equipment adopting call loss rate based routing mode, in which the sub call centers Hangzhou Mobile, Ningbo Mobile and Wenzhou Mobile have registered in the NIRC as shared equipment adopting call loss rate based routing mode for 1861 service. The shared equipment group is named Zhejiang Network 1861.

After performing the configuration, when one of the three sub call centers receives a call request for 1861 service, the sub call center will send a routing request to the NIRC, which calculates the call loss rate based on the put-through call numbers and call losses reported by the three sub call centers, and takes the sub call center with the lowest call loss rate among the three sub call centers as the destination sub call center. If the destination sub call center is the requesting sub call center, the call request will be returned to the requesting sub call center directly for further process. Otherwise, i.e., the destination sub call center is different from the requesting sub call center, a connection will be established between the destination and the requesting sub call centers to forward the network call for further process, i.e., perform Block 406.

The foregoing are only preferred embodiments of the present invention and are not for use in limiting the protection scope thereof All modifications, equivalent replacements or improvements in accordance with the spirit and principles of the present invention shall be included in the protection scope of the present invention.

The invention claimed is:

1. A method for routing a network call in a network call center which comprises multiple sub call centers, comprising:

receiving a network call routing request from a requesting sub call center;

reporting put-through call numbers and call losses by the multiple sub call centers periodically;

determining a destination sub call center based on service capacity parameters of the multiple sub call centers corresponding to a network call service, wherein the service capacity parameters comprise put-through rates or call loss rates of the multiple sub call centers and forwarding the network call routing request to the determined destination sub call center for a call process;

wherein the process of determining the destination sub call center based on the service capacity parameters of the multiple sub call centers corresponding to the network call service comprises:

calculating the put-through rates or the call loss rates of the multiple sub call centers based on the put-through call numbers and the call losses reported by the multiple sub call centers, wherein a cyclic moving window algorithm is used for calculating the put-through rates or the call loss rates of the multiple sub call centers;

taking a sub call center with the highest put-through rate or the lowest call loss rate as the destination sub call center.

2. The method according to claim 1, further comprising:
registering by the multiple sub call centers in a shared equipment group corresponding to the network call service, wherein each of the shared equipment corresponds to a sub call center; and
before determining the destination sub call center of the network call service, the method further comprising:
verifying whether the shared equipment group comprises shared equipment corresponding to the requesting sub call center, if the shared equipment group comprises shared equipment corresponding to the requesting sub call center, performing the process of determining the destination sub call center;
otherwise terminating the process.

3. The method according to claim 1, wherein calculating the put-through rates or the call loss rates of the multiple sub call centers with the cyclic moving window algorithm comprises:
taking an interval at which the sub call center reports the put-through call numbers and the call losses as a sample interval m,
setting a statistical duration T,
calculating a put-through call number index AC and a call loss index DC based on the put-through call numbers and the call losses reported by the sub call center,
saving the calculated AC and DC as sample point data and taking n as the present sample point; wherein
an expression for calculating the put-through rates comprises:

$$(AC^n - AC^{n-T/m})/((DC^n - DC^{n-T/m}) + (AC^n - AC^{n-T/m}));$$

and an expression for calculating the call loss rates comprises:

$$(DC^n - DC^{n-T/m})/((DC^n - DC^{n-T/m}) + (AC^n - AC^{n-T/m})).$$

4. The method according to claim 2, wherein registering by the multiple sub call centers in the shared equipment group corresponding to the network call services comprises:
setting access rights of the multiple sub call centers to the shared equipment group; and
before determining the destination sub call center, the method further comprising:
determining whether the requesting sub call center has a right to access the shared equipment group.

5. A network call center, comprising multiple sub call centers and a Network Intelligent Routing Center (NIRC), wherein:
a sub call center is used for sending a network call routing request to the NIRC as a requesting sub call center, or, receiving a network call routing request to perform a call process as a destination sub call center; and
the NIRC is used for receiving a network call routing request from the requesting sub call center, receiving put-through call numbers and call losses from the multiple sub call centers periodically, determining the destination sub call center based on service capacity parameters of the multiple sub call centers corresponding to the network call service, wherein the service capacity parameters comprise put-through rates or call loss rates of the multiple sub call centers, and forwarding the received network call routing request to the determined destination sub call center,
wherein the process of determining the destination sub call center based on the service capacity parameters of the multiple sub call centers corresponding to the network call service comprises:
calculating the put-through rates or the call loss rates of the multiple sub call centers based on the put-through call numbers and the call losses reported by the multiple sub call centers, wherein a cyclic moving window algorithm is used for calculating the put-through rates or the call loss rates of the multiple sub call centers, and
taking a sub call center with the highest put-through rate or the lowest call loss rate as the destination sub call center.

* * * * *